United States Patent
Engberg et al.

(12) 
(10) Patent No.: US 6,501,898 B1
(45) Date of Patent: Dec. 31, 2002

(54) HANDLING OF OPTICAL FIBRES IN CONFINED OR LIMITED SPACES

(75) Inventors: Kristian Engberg, Sollentuna (SE); Stefan Hansson, Sundbyberg (SE); Thomas Hanspers, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/580,207

(22) Filed: May 26, 2000

(30) Foreign Application Priority Data

May 27, 1999 (SE) ................................................ 9901924

(51) Int. Cl.[7] ................................................ G02B 6/00
(52) U.S. Cl. ........................................ 385/135; 385/134
(58) Field of Search ................................. 385/135, 134

(56) References Cited

U.S. PATENT DOCUMENTS

| | | | | |
|---|---|---|---|---|
| 4,627,686 A | * | 12/1986 | Szentesi | |
| 4,840,449 A | * | 6/1989 | Ghandeharizadeh | |
| 4,900,123 A | * | 2/1990 | Barlow et al. | |
| 5,069,523 A | * | 12/1991 | Finzel et al. | 385/135 |
| 5,131,066 A | * | 7/1992 | Foss | 385/135 |
| 5,224,199 A | | 6/1993 | Cortijo | 385/135 |
| 5,311,612 A | * | 5/1994 | Vincent et al. | 385/135 |
| 5,313,546 A | | 5/1994 | Toffetti | 385/135 |
| 5,715,811 A | * | 2/1998 | Macken | 385/135 |
| 5,887,106 A | * | 3/1999 | Cheeseman et al. | 385/135 |
| 6,021,246 A | * | 2/2000 | Koshiyama et al. | 385/134 |
| 6,081,644 A | * | 6/2000 | Stateezny et al. | 385/135 |
| 6,349,634 B1 | * | 6/2001 | Tenney et al. | 385/135 |

FOREIGN PATENT DOCUMENTS

| | | | | |
|---|---|---|---|---|
| EP | 0715196 A1 | * | 5/1996 | G02B/6/44 |
| WO | WO 96/19745 | * | 6/1996 | G02B/6/44 |

* cited by examiner

*Primary Examiner*—Brian Sircus
*Assistant Examiner*—Hae Moon Hyeon
(74) *Attorney, Agent, or Firm*—Burns, Doane, Swecker & Mathis, L.L.P.

(57) ABSTRACT

The present invention relates to an arrangement for handling optical fibers in a confined or limited space, such as connecting, reorganizing and/or cross-coupling optical fibers in a cassette without said fibers intersecting one another. By providing the cassette (4) with looping channels (17), the optical fiber cables can be organized in a controlled fashion without needing to cross. The cassette may also include elements (18, 19) which function to change the direction of the optical fibers prior to connecting said fibers.

6 Claims, 4 Drawing Sheets

HANDLING OF OPTICAL FIBRES IN CONFINED OR LIMITED SPACES

FIELD OF INVENTION

The present invention relates to a device which enables optical fibres/optical fibre ribbons to be organised without coming into direct contact with each other. Optical fibres optical fibre ribbons that mutually intersect in direct contact with each other are liable to influence the information transmitted in the fibres.

DESCRIPTION OF THE BACKGROUND ART

It is known to bring several optical fibre cables together in a closed container for reorganising and/or connecting the fibres. Commercially available solutions for sealing the cable transits or lead-throughs of the container include sealing said transits with the aid of shrink hoses placed on the optical fibre cables, or sealing said transits with the aid of self-vulcanising tape wound on the optical fibre cables, said tape being wound around the cable to an appropriate size. One disadvantage with the use of shrink hoses lies in the primary requirement of heat. The hoses must either be heated electrically or with the aid of gas. The former often requires the provision of a power source at the place where the cables are to be connected, while the latter constitutes an explosion hazard. The drawback with self-vulcanising tape is that installation is operator-dependent and that addition material is often required when resealing a used container, such as a connecting box.

U.S. Pat. No. 5,224,199A teaches a connecting box intended for optical fibre cables and comprising a bottom part and a top part which can be joined to the bottom part, wherein the bottom part and the top part each include grooves which face one another when said parts are joined one to the other so as to define channels into which elastic plugs that carry optical fibre cables are inserted. The elastic plugs are slotted, so as to facilitate both fitting and removal of the cables and enable the elastic plugs to be first placed on the optical fibre cables, so that the top part of the box can be connected to its bottom part with the plugs carrying said cables placed in the channels between the box parts. Dismantling of the cable from the box is effected by first separating the top part of the box from its bottom part and then opening the plugs, which is easily done, and removing the plugs from the cables and therewith release the same.

U.S. Pat. No. 5,313,546 teaches the use of an hermetically sealed connection encapsulation intended for optical fibre cables and comprising a bottom part which includes seal-accommodating channels and a lid which is connectable to said bottom part, wherein the seals include holes for accommodating optical fibre cables inserted thereinto. The seals of this solution have also been slotted to facilitate insertion of the cables into the seals prior to fitting the seals into the channels in the bottom part of the encapsulation.

SUMMARY OF THE INVENTION

With the intention of facilitating handling of optical fibre cables in a limited or confined space, such as an enclosed space, for instance in a sealed fibre/cable connecting box arrangement for reorganising and/or connecting optical fibres present in said cables, the closed space has been provided with means for guiding and coiling the cables prior to stripping respective cables and mutually separating the enclosed optical fibres in an optical fibre cassette. In addition to organising the cables in said space in an ordered and controllable fashion, the provision of means for guiding and coiling the cables in said confined or limited space also ensures that essentially the same preparation lengths are obtained with respect to the different cables, regardless of the transit or lead through which they have been inserted into said space, while also enabling the bending radii of the optical fibre cables to be monitored.

The object of the present invention is to produce an optical fibre connection cassette which is able to store a large amount of optical fibre surplus and which can facilitate reconnection and reorganisation of the optical fibres on the part of the installation engineer.

This can be achieved with a cassette which includes only one fibre inlet from which there is found only one single filament coiling path which is able to house all fibres, in other words fibres that are to be connected to one another lie organised in one and the same coiling or winding path right up to a possible fibre connecting location.

The invention will now be described in more detail with reference to a preferred embodiment thereof and also with reference to the accompanying drawings.

DESCRIPTION OF PREFERRED EMBODIMENTS

Figure 1:
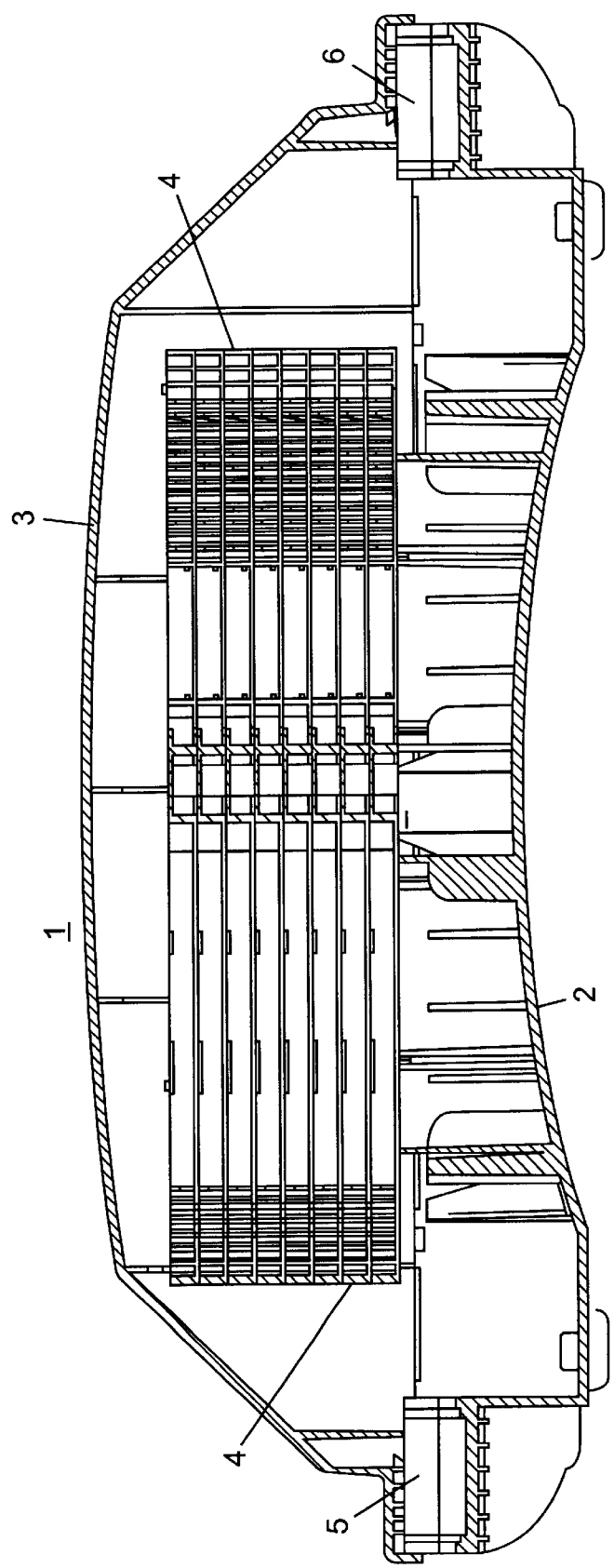
FIG. 1 illustrates a connecting box arrangement for optical fibre cables arranged in accordance with the invention.

FIG. 1 illustrates an openable cable connecting box arrangement 1 according to the invention, which includes a bottom part 2, a top part 3 and several optical fibre cassettes 4 for organising and coiling the optical fibres. The box arrangement can be connected with optical fibre cables that are sealed by cable seals, by inserting the cables through openings 5, 6 at respective ends of the connecting box. The bottom part of the box can be joined to its top part with the aid of locking or latching means for instance, so as to obtain an easily opened connecting box arrangement. In order to provide a positive and tight connection of the optical fibre cables, the ends of the top and bottom parts of the box may be provided with mutually coacting and openable nut and bolt joints and a sealing device, such as an O-ring, may be placed between the respective mutually facing connecting surfaces of the top and bottom parts of the box. The bottom part of the box includes a space which accommodates means for guiding and coiling incoming and outgoing optical fibre cables. When the top part 3 of the box is given an appropriate height, several optical fibre cassettes 4 can be stacked on the lower part and accommodated in said top part. One or more openings for sealed transit of the optical fibre cables may be provided on each side of the ends of the bottom part of the box. The top and bottom parts of the connecting box arrangement will preferably be made of a plastic material, such as polycarbonate, polyphenyl oxide, polybutiene terephthalate, polypropylene or the like.

Figure 2:
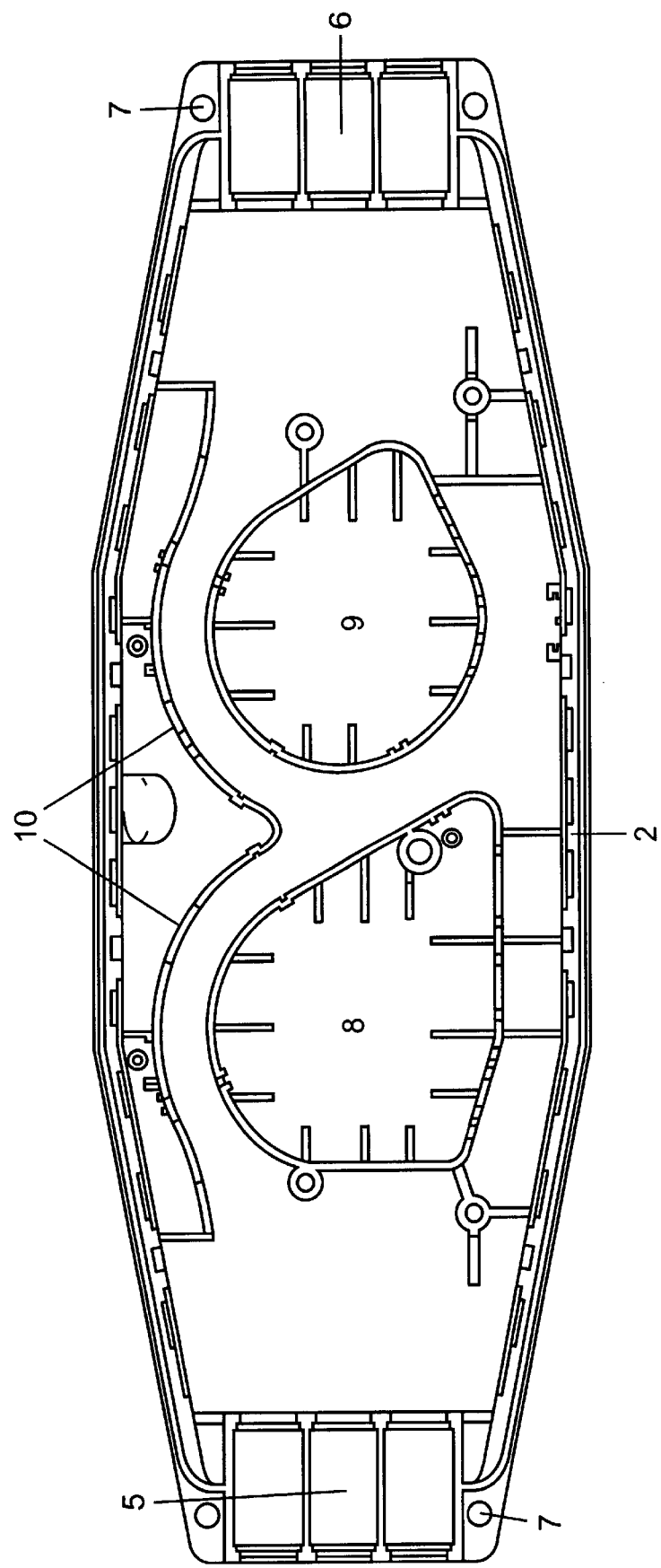
FIG. 2 shows a bottom part of the box arrangement of FIG. 1 from above.

FIG. 2 shows the bottom part 2 of the box arrangement from above. Both short sides of the bottom part 2 include openings 5, 6, such as apertures, for insertion of optical fibre cables into cable seals. The illustrated openings have smooth sides and a semi-cylindrical bottom so as to conform fully with the cross-sectional shape of the cable seals, therewith enabling the cable transits to be made completely tight. Provided at the ends of the bottom part are holes 7 for receiving screws or like fasteners for fixing the top part 3 to the bottom part 2 and for clamping intermediate cable seals enclosing optic fibre cables to prevent the ingress of moisture into the interior space of the connecting box arrangement. Arranged in the central portion of the bottom part of the box are two cable coiling and guiding devices 8,9 which function to coil or wind the incoming and outgoing cables. An undulating guide element 10 is provided on one side of the inside of the bottom part of the box arrangement. The arrangement also includes various holes for receiving screws or like fasteners for securing devices that hold the cassettes 4 disposed on the bottom part 2 of the box interior.

Figure 3A:
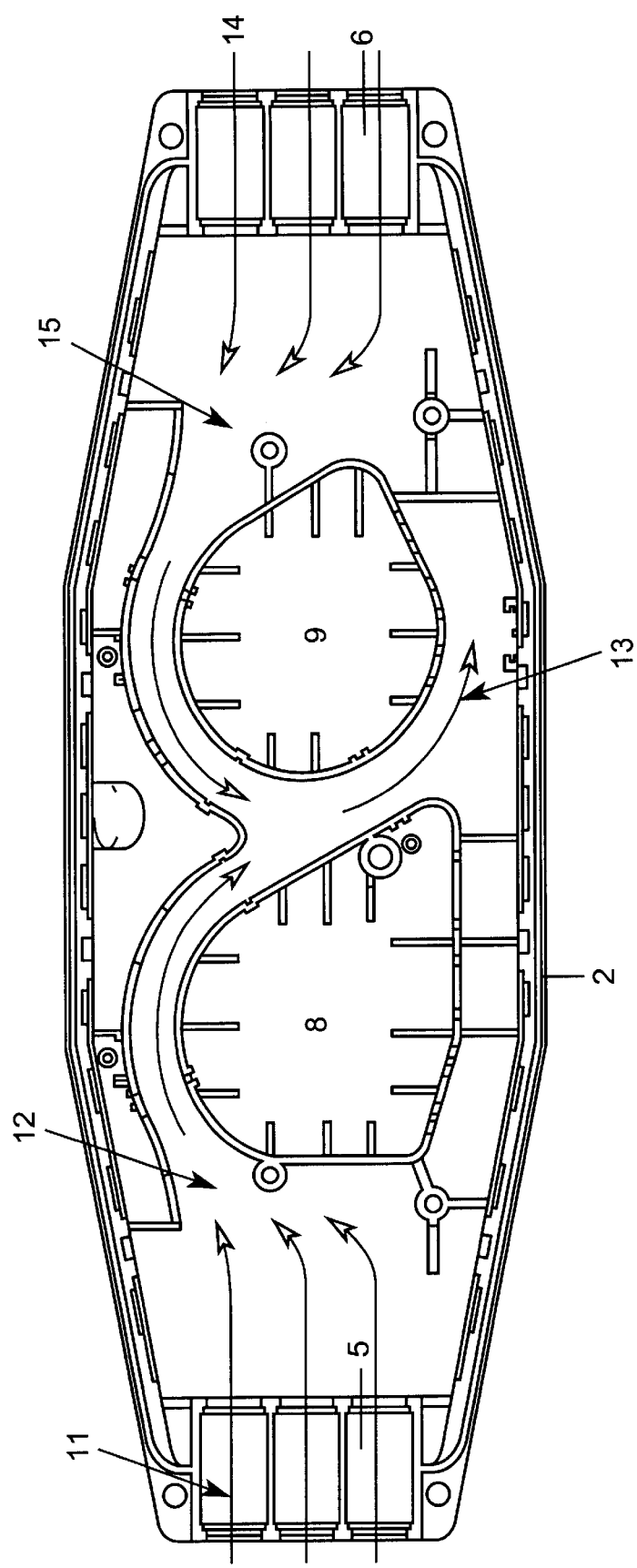
FIG. 3A illustrates with the aid of arrows the directions in which incoming and outgoing optical fibre cables are inserted into the bottom part of the box shown in FIG. 2 for correct placement of the fibres/cables in the guide grooves in said bottom part.

FIG. 3A shows with arrows in the bottom part of the box the insertion directions of the optical fibre cables and optical fibres. As shown at 11, the incoming cables containing optical fibres are passed into the bottom part of the box arrangement through the openings 5, 6 and are first guided towards a channel 12 and over the first coiling device 8 and then beneath the second coiling device 9 and then to overlying optical fibre accommodating cassettes or for further coiling of the cable around the second coiling device. The coiling devices 8, 9 enable individual cables to be coiled for storage in the box arrangement, or for obtaining lengths of optical fibre cable which are equivalent to the length of the optical transport paths in an optical fibre system. As shown at 14, the optical fibres of the outgoing optical fibre cables are passed into the bottom part of the box arrangement and first guided up towards the channel 15 and over the second coiling device 9, and from there up to the overlying cassettes, for instance.

Figure 3B:
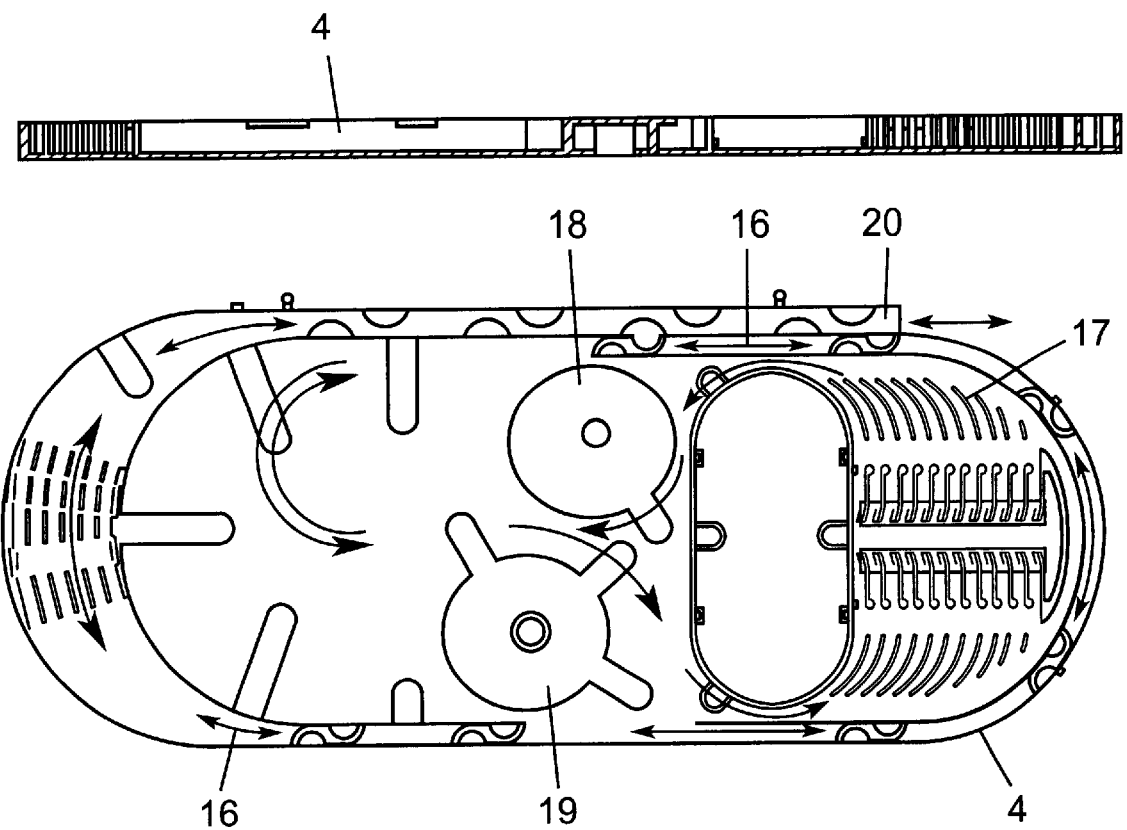
FIG. 3B illustrates from one side and from above an optical fibre cassette, and shows with the aid of arrows the directions in which the optical fibres are inserted for correct placement of the optical fibres/cables in said optical fibre cassette.

FIG. 3B illustrates from one side and from above a flat cassette 4 for coiling or winding one or more optical fibres/optical fibre ribbons in a looping channel 17 that includes room for connecting and/or redirecting optical fibres with the minimum of fibre intersection. By using centrally mounted coiling devices 18, 19 in said cassette, optical fibres/optical fibre ribbons laid in the cassette can be turned and their directions changed in said cassette, which may be necessary in order to connect the fibres. The cassette inlet is referenced 20. Arrows 16 show the direction in which the optical fibres/optical fibre ribbons are coiled or wound. This type of optical fibre cassette enables optical fibres/optical fibre ribbons to be put into the cassette without the fibre surplus paths needing to cross one another. This is particularly important when fibre ribbons are installed, since such ribbons have a significant height and require head room when stacked one upon the other. A primary purpose of the cassette is to store surplus fibre while still providing room for possible vibrations. The inventive design of the fibre coiling paths enables surplus optical fibres to be stored in loops without the optical fibres crossing one another.

It will be understood that the invention is not restricted to the aforedescribed and illustrated embodiments thereof and that modifications can be made within the scope of the accompanying Claims.

What is claimed is:

1. An arrangement for handling optical fibres in a confined or limited space without crossing one another of the optical fibres characterized in that:

in a confined and limited space between an upper part and a bottom part of the arrangement, one or more optical fibre cassettes are provided to be stacked on each other on the bottom part;

in that every optical fibre cassette is provided with means for storing and guiding of optical fibres when separately winding the optical fibres in said cassette, wherein said means for storing and guiding controls the bent radius of the optical fibre and allows the same length of preparation for different optical fibres to be achieved without crossing one another of the optical fibres.

2. An arrangement according to claim 1, characterised in that said means for storing and guiding (17) has the form of looping channels in said cassette, said looping channels enabling incoming optical fibres to be separated for reorganisation.

3. An arrangement according to claim 1, characterised in that means (18, 19) are provided in the optical fibre cassettes for changing the direction of the optical fibres.

4. A device for handling optical fibres, the device comprising:

a top part;

a bottom part;

locking means for joining the top part and the bottom part together, wherein the top and bottom part are configured to provide space for one or more optical fibre cassettes to be stacked on each other on the bottom part;

coiling means on the bottom part for enabling individual optical fibres to be coiled for storage in the one or more optical fibre cassettes; and at least one optical fibre cassette, wherein said at least one fibre optical cassette comprises:

means for guiding and winding optical fibres to be separately stored within the fibre optical cassette; and looping channels to enable incoming optical fibres to be separated for reorganization without the optical fibres crossing one another.

5. The device of claim 4, wherein said means for guiding and winding optical fibres controls the bending radius of the optical fibres.

6. The device of claim 4, wherein said at least one optical fibre cassette further comprises:

means for changing the direction of the optical fibres.

* * * * *